United States Patent [19]

Carbonell et al.

[11] Patent Number: 5,045,190

[45] Date of Patent: Sep. 3, 1991

[54] CHROMATOGRAPHY APPARATUS

[76] Inventors: Ruben G. Carbonell, 6105 Godfrey Dr., Raleigh, N.C. 27612; Peter K. Kilpatrick, 5101 Huntingdon Dr.; Juan L. Torres, 1236 Teakwood Pl., both of Raleigh, N.C. 27606; Roberto Guzman, 2361 McMullan Cir., Raleigh, N.C. 27608

[21] Appl. No.: 578,888

[22] Filed: Sep. 5, 1990

Related U.S. Application Data

[63] Continuation of Ser. No. 268,811, Nov. 8, 1988, abandoned, which is a continuation-in-part of Ser. No. 119,020, Nov. 10, 1987, abandoned.

[51] Int. Cl.$^5$ .............................................. B01D 15/08
[52] U.S. Cl. ............................. 210/198.2; 210/502.1; 210/635; 210/656; 502/402; 502/403
[58] Field of Search ..................... 502/401, 402, 403; 435/174, 176, 177, 181; 210/635, 656, 660, 679, 198.2, 502.1; 530/413, 417

[56] References Cited

U.S. PATENT DOCUMENTS

| | | | |
|---|---|---|---|
| 3,947,352 | 3/1976 | Cuatrecasas et al. | 210/31 |
| 3,960,720 | 9/1976 | Porath et al. | 260/112.5 |
| 3,966,580 | 6/1976 | Janata et al. | 204/195 B |
| 4,076,930 | 2/1978 | Ellingboe et al. | 536/1 |
| 4,177,038 | 12/1979 | Biebricher et al. | 8/192 |
| 4,216,083 | 8/1980 | Dale et al. | 210/31 |
| 4,312,944 | 1/1982 | Mattiasson | 435/7 |
| 4,330,440 | 5/1982 | Ayers et al. | 525/54 |
| 4,409,105 | 10/1983 | Hayashi et al. | 210/679 |
| 4,411,795 | 10/1983 | Olson | 210/679 |
| 4,421,650 | 12/1983 | Nagasawa et al. | 210/635 |
| 4,470,909 | 9/1984 | Bright | 210/634 |
| 4,490,290 | 12/1984 | Gani et al. | 260/112 B |
| 4,507,390 | 3/1985 | Horiuchi et al. | 436/161 |
| 4,508,833 | 4/1985 | Sonneborn et al. | 436/543 |
| 4,522,724 | 6/1985 | Ramsden | 210/635 |
| 4,551,435 | 11/1985 | Liberti et al. | 436/541 |
| 4,554,157 | 11/1985 | Skelly | 210/656 |
| 4,560,599 | 12/1985 | Regen | 428/36 |
| 4,640,835 | 2/1987 | Shimizu et al. | 424/94 |
| 4,655,931 | 4/1987 | Kawamoto | 210/679 |
| 4,773,939 | 9/1988 | Meffert et al. | 134/10 |
| 4,826,759 | 5/1989 | Guire | 435/14 |
| 4,828,996 | 5/1989 | Siegel | 435/177 |
| 4,851,382 | 7/1989 | Kusano et al. | 502/401 |

FOREIGN PATENT DOCUMENTS 65-1290 7/1986 Sweden ............................ 210/198.2

OTHER PUBLICATIONS

Olsson, U. et al., "The Use of Reversibly Immobilized Ligands" *Biological Chemistry Hoppe-Seyler* 368 (1987) (Abstract).

(List continued on next page.)

*Primary Examiner*—Ernest G. Therkorn

[57] ABSTRACT

A chromatography apparatus incorporating an improved means for connecting the ligand to the solid support is disclosed. The apparatus comprises a chamber containing a solid support. The solid support is a hydrophobic support. The apparatus includes chromatography surfactants bonded to the solid support. The surfactants comprise a polar group, a hydrophobic functional group substituted on the polar group, and a chromatographic functional group substituted on the polar group. The hydrophobic group is hydrophobically adsorbed to the solid support so that the chromatographic functional group is bound to the solid support and available for binding to compounds which selectively bind thereto. Compositions for and methods of making the foregoing are disclosed.

The chromatographic functional group is a ligand for affinity chromatography, an ionogenic group for ion exchange chromatography, or a hydrophobic group for hydrophobic chromatography.

Hydrophobic silica particles are preferably used as the solid support, with hydrophobic polymers more preferred. Polyalkoxy groups are preferably used as the polar groups. Covering surfactants are preferably adsorbed to the solid support to reduce non-specific binding thereto.

11 Claims, 2 Drawing Sheets

OTHER PUBLICATIONS

Olsson, U. and Mattiasson, B., "Theoretical and Experimental Evaluation of the Use of Heterobifunctional Affinity Ligands in General Chromatographic Systems", *Journal of Chromatography* 370, 29 (1986).

Mattiasson, B. and Olsson, U., "General Chromatographic Purification Procedure Based on the Use of Heterobifunctional Affinity Ligands" *Journal of Chromatography* 370, 21 (1986).

Cooke, N., High Performance Affinity Chromatography LC-GC 866 (1987).

Lowe, C. R. and Dean, P. D. G., *Affinity Chromatography*, John Wiley & Sons, New York, pp. 218–220 (1974).

Bischoff, R. and McLaughlin, L., "Chemically Synthesized Hydrophobic Anion Exchange High Performance Liquid Chromatography Supports", *Journal of Chromatography* 270, 117 (1983).

Mikes, *Laboratory Handbook of Chromatographic and Allied Methods* (John Wiley and Sons, New York) (1979), pp. 33 and 171.

Subramaniam, S. et al., *Proc. Natl. Acad. Sci. USA*, 83, (1986), pp. 1169–1173.

Regen, S. et al. *Macromolecules*, 17, (1984), p. 1294.

Regen S. et al., *Macromolecules*, 16, (1983), pp. 335-338.

Albrecht, O. and Laschewsky, A., *Macromolecules*, 17, (1984), pp. 1292–1293.

CHROMATOGRAPHY APPARATUS

RELATED APPLICATIONS

This application is a continuation-in-part of application Ser. No. 07/268,811, filed on Nov. 8, 1988, which is a continuation-in-part application of pending prior application Ser. No. 07/119,020 filed on Nov. 10, 1987, both now abandoned.

FIELD OF THE INVENTION

The present invention relates to chromatography generally, and particularly relates to the attachment of ligands to solid supports in chromatography apparatus.

BACKGROUND OF THE INVENTION

Chromatography procedures include affinity chromatography, ion exchange chromatography, and hydrophobic chromatography. The use of affinity chromatography for the purification of biological macromolecules is well-established. Under optimal conditions in the laboratory, the results of affinity chromatography purifications can be spectacular. For example, yields of 90% and purification factors of over 6000 have been reported for avidin, Cuatracasas, P. and Wilchek, M., *Biochem. Biophys. Res. Commun.* 33, 235 (1968), and vitamin $B_{12}$-binding protein, Allen, R. H., and Majerus, P. W., *J. Biol. Chem.* 247, 7702 (1972). The success of affinity chromatography in small-scale purifications has been harder to realize on a larger scale partly because of the expense and difficulty involved in chemically derivatizing solid supports with affinity ligands. In addition, it is difficult to achieve high flow rates with these packings, and they are not easy to sterilize and still maintain their biological activity. For this reason, there is a continued interest in the development of more convenient methods of attaching specific ligands to solid supports.

The use of heterobifunctional ligands in affinity chromatography has recently been proposed. See Mattiasson, B. and Olsson, U., *J. Chromatog.* 370, 21 (1986); Olsson, U. and Mattiasson, B., *J. Chromatog.* 370, 29 (1986). In this work, trypsin was connected to a sepharose support by a conventional cyanogen bromide reaction. A heterobifunctional ligand comprising dextran, with soybean trypsin inhibitor (STI) and Cibacron Blue substituted thereon, was prepared, and the heterobifunctional ligand bound to the sepharose through the interaction of trypsin and STI. The Cibacron Blue so bound to the sepharose was used to extract lactate dehydrogenase from bovine heart extract. While this procedure permits Cibacron Blue to be removed from the sepharose for sanitizing of the sepharose and replacement with a different ligand, the procedure disadvantageously employs a potentially toxic cyanogen bromide reaction, and requires the binding of a protein, trypsin, to the solid support. The protein is subject to denaturation and microbial attack.

In view of the foregoing, a first object of the present invention is to provide a chromatography apparatus in which chromatographic functional groups are easily and reversibly bound to a solid support.

A second object of the present invention is to increase the capacity of the solid support for the chromatographic functional groups bound thereto.

A third object of the present invention is to provide new means for associating chromatographic functional groups with the groups which reversibly bind the chromatographic functional groups to the solid support.

A fourth object of the present invention is to provide a way to reduce nonspecific binding to the solid support in a chromatography apparatus.

A fifth object of the present invention is to provide a method of making chromatography apparatus in which the chromatographic functional groups are reversibly bound to the solid support, and a sixth object of the present invention is to provide a means for removing chromatographic functional groups reversibly bound to the solid support.

A seventh object of the present invention is to provide different materials as the solid support in chromatography apparatus which achieve some or all of the foregoing objects.

An eighth object of the present invention is to provide ion exchange chromatography apparatus which achieve, at least in part, the foregoing objects.

A ninth object of the present invention is to provide hydrophobic chromatography apparatus which achieve, at least in part, the foregoing objects.

A tenth object of the present invention is to provide materials which can be used to produce chromatography apparatus as described above, and particularly materials which can be used to produce chromatography apparatus in which nonspecific binding to the solid support is reduced.

The foregoing objects are achieved by the apparatus, methods, and materials disclosed below.

SUMMARY OF THE INVENTION

Affinity chromatography apparatus is disclosed herein. The apparatus comprises an enclosed chamber having an inlet opening and an outlet opening. A solid support, such as sepharose, is contained within the enclosed chamber. The solid support has hydrophobic functional groups bonded to the surface thereof and forming a hydrophobic layer thereon. Affinity surfactants are bound to the solid support. The affinity surfactants comprise a polar group, a hydrophobic functional group substituted on the polar group, and a ligand substituted on the polar group. The hydrophobic functional group on the affinity surfactants are hydrophobically adsorbed to the hydrophobic layer formed on the solid support. The ligands are thereby bound to the solid support and available for binding to compounds which selectively bind to the ligands.

A first improvement to the foregoing provides a means for increasing the capacity of the solid support for the affinity surfactant. It has unexpectedly been found that, when silica particles are used as the solid support, the capacity of the solid support for the affinity surfactants is significantly increased. A second improvement involves the use of a polyalkoxy group as the polar group in the affinity surfactant. Polyalkoxy polar groups are less subject to non-specific binding, and advantageously facilitate the construction of affinity chromatography apparatus from which the leakage of the ligand is low. A third improvement provides a means for reducing non-specific binding to the hydrophobic layer of the solid support. In this improvement, the apparatus described above further comprises covering surfactants bonded to the solid support. The covering surfactants comprise a polar group and a hydrophobic functional group substituted on the polar group. These groups may be the same as those found in the affinity surfactants, with the hydrophobic functional group similarly being hydrophobically adsorbed to the hydrophobic layer formed on the solid support. The covering surfactant is provided in an amount sufficient to cover the hydrophobic layer so that non-specific binding to the hydrophobic layer during use of the column is reduced.

A method of manufacturing an affinity chromatography apparatus of the kind described above comprises three steps. One step is to provide an enclosed chamber having an inlet opening and an outlet opening, with the chamber having a solid support contained therein. The solid support has hydrophobic functional groups bonded to the surface thereof and forming a hydrophobic layer thereon. Another step is to provide an aqueous solution containing affinity surfactants. The affinity surfactants comprise a polar group, a hydrophobic functional group substituted on the polar group, and a ligand substituted on the polar group. The final step is to pass the aqueous solution through the enclosed chamber so that the hydrophobic functional groups of the affinity surfactants are hydrophobically adsorbed to the hydrophobic layer formed on the solid support. The ligands are thereby bound to the solid support and available for binding to compounds which are selectively bound by the ligands. The ligands may be removed from the apparatus by passing a polar organic solvent through the apparatus so that the affinity surfactants are removed from the hydrophobic layer and taken up in the polar organic solvent. The apparatus, free of the ligands, may then be sanitized or sterilized for re-use.

Disclosed herein are chromatography apparatus advantageously employing hydrophobic polymers as the solid support. Such an apparatus comprises a solid hydrophobic polymer support and chromatography surfactants bonded to the polymer support. The chromatography surfactants comprise a polar group, a hydrophobic functional group substituted on the polar group, and a chromatographic functional group substituted on the polar group. The hydrophobic functional group is hydrophobically adsorbed to the polymer support, with the chromatographic functional group thereby being bound to the solid support and available for binding to compounds which are selectively bound thereby. Preferably, the hydrophobic polymer support is contained within an enclosed chamber having an inlet opening and an outlet opening, though applications in which the chamber is absent are contemplated and are explained below.

Ion exchange chromatography apparatus are disclosed herein. Such an apparatus comprises an enclosed chamber having an inlet opening and an outlet opening, a solid hydrophobic support contained within the enclosed chamber, and ion exchange surfactants bonded to the solid support. The ion exchange surfactants comprise a polar group, a hydrophobic functional group substituted on the polar group, and an ionogenic group substituted on the polar group. The hydrophobic functional group is hydrophobically adsorbed to the solid support, the ionogenic groups thereby being bound to the solid support and available for binding to compounds which are bound thereby.

Hydrophobic chromatography apparatus are also disclosed herein. Such an apparatus comprises an enclosed chamber having an inlet opening and an outlet opening, a solid hydrophobic support contained within the enclosed chamber, and hydrophobic surfactants bonded to the solid support. The hydrophobic surfactants comprise a polar group, a first hydrophobic functional group substituted on the polar group, and a second hydrophobic functional group substituted on the polar group. The first hydrophobic functional group is hydrophobically adsorbed to the solid support. The second hydrophobic functional group has a partition coefficient not greater than (and preferably less than) the first hydrophobic functional group. In this apparatus, the second hydrophobic functional group is bound to the solid support and available for bonding to compounds which will adsorb thereto.

Disclosed herein are solutions useful for making chromatography apparatus of the type described herein. The solution, preferably an aqueous solution, contains chromatography surfactants. The chromatography surfactants comprise a polar group, a hydrophobic functional group substituted on the polar group, and a chromatographic functional group substituted on the polar group. The polar group is a polyalkoxy group having at least two alkoxy groups, with the alkoxy groups selected from the class consisting of ethoxy and isopropoxy. Preferably, the polar group, the hydrophobic group and the chromatographic group are selected so that the solution is a single phase solution. Also disclosed herein are solutions, useful for making chromatography apparatus as described herein, in which nonspecific binding to the solid support is reduced. These solutions, also preferably aqueous solutions, comprise chromatographic surfactants and covering surfactants in combination in a liquid solvent. The chromatographic surfactants comprise a polar group, a hydrophobic functional group substituted on the polar group, and a chromatographic functional group substituted on the polar group. The covering surfactants comprise a polar group and a hydrophobic functional group substituted on the polar group. The covering surfactants, when bound to a solid support in a chromatography apparatus, serve to inhibit nonspecific binding to the support during use of the apparatus. Preferably, the polar group and hydrophobic group of the covering surfactants and the polar group, the hydrophobic group, and chromatographic group of the chromatography surfactants are selected so that the solution is a single phase solution.

DETAILED DESCRIPTION OF THE INVENTION

The term "chromatography surfactant", as used herein, refers to affinity surfactants, ion exchange surfactants, and hydrophobic surfactants. Each of these latter terms is explained below.

The term "chromatographic functional group", as used herein, refers to ligands, ionogenic groups, and hydrophobic functional groups. Each of these latter terms is explained below.

The term "solid hydrophobic support", as used herein, refers to all hydrophobic solid supports, including, for example, (a) hydrophobic agarose, sepharose, and cellulose, (b) hydrophobic silica, and (c) hydrophobic polymers.

Enclosed chambers used for practicing the present invention are typically columns of the type used in affinity chromatography and high performance affinity chromatography, ion exchange chromatography, and hydrophobic chromatography. The solid support contained within the column may be any conventional solid support, such as agarose, sepharose, or cellulose, but among these silica particle supports are preferred. The silica particles may, for example, be those porous silica particles conventionally employed in liquid chromatography, having pores ranging in width from 60 to 4000 Angstroms, but may also be non-porous particles.

The hydrophobic functional groups bound to the solid supports may be benzyl groups or linear or branched alkyl groups having from 2 to 50 carbon atoms and any degree of unsaturation. Preferably, the hydrophobic groups are linear alkyl groups having from 8 to 50 carbon atoms. Exemplary alkyl groups are octyl, decyl, dodecyl, tetradecyl, hexadecyl, octadecyl, and eicosyl.

Hydrophobic functional groups may be covalently bonded to solid supports by conventional techniques. Such solid supports are commercially available as reverse phase packings. As noted above, superior results are obtained when silica particles are used as the solid support. To achieve these superior results, the silica particles should have bonded thereto at least 100 micromoles, more preferably at least 200 micromoles, and most preferably at least 400 micromoles, of the hydrophobic functional group per milliliter of silica particles.

Affinity surfactants of the present invention have the general formula A-B-L, where A is a hydrophobic functional group, B is a polar group, and L is a ligand which specifically binds to a target molecule. The hydrophobic functional group may be any of the hydrophobic functional groups noted with respect to silica particles above, with the same class preferred for silica particles being preferred for the affinity surfactants.

The polar group may be any hydrophilic spacer arm conventionally used in affinity chromatography and having a substitution site at each end. See *generally* C. Lowe and P. Dean, *Affinity Chromatography*, 218–220 (1974).

Preferably, however, the polar group is a polyalkoxy group having at least 2 alkoxy groups selected from the class consisting of ethoxy and isopropoxy. Broadly speaking, the polyalkoxy group will have not more than 50 alkoxy groups. Preferably, however, the polyalkoxy group will have from 5 to 30 alkoxy groups therein. A ligand can be substituted for the hydroxyl group at one end of the polyalkoxy group and a hydrophobic functional group substituted for the hydroxyl group at the other end of the polyalkoxy group by known procedures. Minor substitutions to polyalkoxy groups which do not substantially affect the polarity of the polyalkoxy groups produce equivalent compounds for purposes of this invention. Fluorinated polyalkoxy groups are exemplary of such equivalent compounds.

Ligands which will bind to any of a variety of target molecules can be employed in the affinity surfactants of the present invention. Exemplary of such ligands, and the target molecules bound thereby, are the following: Biotin and Avidin; Monoclonal Antibodies and Inhibin; Procainamide and Cholinesterase; N-methyl Acridinium and Acetylcholinesterase; P-aminobenzamidine and Trypsin; P-aminophenol-beta-D-thiogalacto-pyranoside and Beta-Galactosidase; Chitin and Lysozyme; Methotrexate and Dihydrofolate Reductase; AND and Alcohol Dehydrogenase; Sulfanilamide and Carbonic Anhydrase; DNA and DNA Polymerase; DNA and cDNA; DNA and RNA; cDNA and Genetically Engineered Plasmids; Oxidized Glutathione and Glutathione Reductase; P-aminobenzamidine and Urokinase; Monoclonal Antibodies and Insulin; Trypsin and Soybean Trypsin Inhibitor; $N^6$-aminocaproyl-3',5'-cAMP and Protein Kinase; Pepstatin and Renin; 4-Chlorobenzylamine and Thrombin; Monoclonal Antibodies and Interferon; N-(4-amino phenyl) Oxamic Acid and Influenza Virus; Prealbumin and Retinal-binding Protein; Neurophysin and Vasopressin; Lysine and Plasminogen; Heparin and Antithrombin; Cycloheptaamylose and Human Serum Amylase; Cortisol and Transcortin; Pyridoxal-5-phosphate and Glutamate-pyruvate transaminase; Chelating Agents and Metal Ions; Chelating Agent-Cu and Superoxide Dismutase; Chelating Agent-Zn and Human Fibrinogen; Coenzyme A and Succinic Thiokinase; Flavin and Luciferase; Pyridoxal Phosphate and Tyrosine Aminotransferase; Porphyrin and Haemopexin; Lysine and Ribosomal RNA; Polyuridine and mRNA; Concanavalin A and Immunoglobulins; 3-phospho-3-hydroxypropionate and Enolase; D-malate and Fumarate Hydratase; Atropine or Cobratoxin and Cholinergic Receptors; 6-Aminopenicillanic acid and D-Alanine Carboxypeptidase; Plant Lectins and Epidermal Growth Factor Receptors; Alprenolol and Epinephrine Receptors; Growth Hormone and Prolactin Receptors; Insulin and Insulin Receptors; Estradiol or Diethylstilbestrol and Estrogen Receptors; Dexamethasone and Glucocorticoid Receptors; Hydroxycholecalciferol and Vitamin D Receptors; Virus Monoclonal Antibodies and Blood Viruses; and Monoclonal Antibodies and Bacteriophages. Suitable chelating agents for practicing the present invention include ethylenediaminetetraacetic acid (EDTA) and other compounds containing the iminodiacetic acid group, phosphonoacetic acid ($H_2O_3P$-$CH_2COOH$), pyrophosphate (such as dibasic pyrophosphate hexahydrate), dibasic orthophosphate, crown ethers such as dicylohexano-18-crown-6, cyclodextrins, and cryptands. In overview, suitable ligands include, but are not limited to, antibodies, nucleic acids, antitoxins, peptides, chelating agents, enzyme inhibitors, receptor agonists, and receptor antagonists. The term "antibody", as used herein, means immunoglobulins such as IgA, IgG, IgM, IgD, and IgE, whether monoclonal or polyclonal in origin.

Aqueous solutions containing the affinity surfactants described above are used to make the chromatography apparatus described above. In preparing these solutions, the polar group, the hydrophobic group and the ligand are preferably selected so that the affinity surfactants are soluble in the aqueous solution. The aqueous solution will thus be a single phase aqueous solution.

We have found solid hydrophobic polymer supports particularly advantageous for practicing the present invention. With such supports, the need for further covering the support with hydrophobic functional groups is eliminated. Such solid hydrophobic polymers comprise a matt of intertwined hydrophobic polymer chains, the chains having molecular weights of from about 10,000 daltons to about 10,000,000 daltons. The polymer may optionally be porous. Suitable polymer materials include, for example, polyethylene, polypropylene, polyether sulfone, polystyrene, polydivinylbenzene, polytetrafluoroethylene, polymethyl methacrylate, polydimethyl siloxane, and blends thereof. Copolymers of hydrophobic and hydrophilic polymers which are sufficiently hydrophobic to bind surfactants are intended as encompassed by the term "hydrophobic polymer" herein. Porous polypropylene, such as that available from the AKZO company under the trade name ACCUREL®, is particularly preferred. The polymer support may be in any form, including, for example, particles, beads, cards, sheets, fibers, hollow fibers, and semipermeable membranes. The polymer supports, except for cards, are preferably contained within an enclosed chamber having an inlet and an outlet. Polymer cards with chromatographic surfactants (preferably affinity surfactants) bound thereto are useful as a diagnostic or analytic tool which need not be contained within an enclosed chamber.

Ion exchange surfactants of the present invention preferably have the general formula A-B-I, where A and B are as given in connection with the affinity surfactants described above and I is an ionogenic group. The ionogenic group is selected from the class consisting of cation and anion. Suitable anions are, for example, $-SO_3$, $-CH_2SO_3$, $-C_2H_4SO_3$, $-C_3H_6SO_3$, $-PO_3^{2-}$, $-COO$, and $-CH_2COO$. Suitable cations include quaternary amines and sulfonium ions, with the quaternary amines preferred. Exemplary quaternary amines are $-CH_2N^+(CH_3)_3$, $-CH_2N^+(CH_3)_2C_2H_4OH$, $-C_2H_4N^+(C_2H_5)_3$, $-C_2H_4N^+(C_2H_5)_2CH_2CH(OH)CH_3$, $-C_2H_4NHC(NH_2)N^+H_2$, $-C_5H_4N^+CH_3$, $-C_2H_4N^+H(C_2H_5)_2$, $-C_2H_4N^+H_3$, $-C_2H_4N^+H_2)_nC_2H_4N^+H_3$ wherein n is from one to ten, $-N^+HR_2$ wherein R is H or a linear or branched alkyl group having from one to ten carbon atoms and any degree of unsaturation, $-CH_2C_6H_4N^+H_3$, and $-N^+C_5H_5$. Hydrophobic chromatography surfactants of the present invention preferably have the general formula A-B-H, where A and B are the same as given in connection with the affinity surfactants described above and H is a second hydrophobic group (A being the first hydrophobic group). H has a partition coefficient not greater than, and preferably less than, A. The term "partition coefficient", as herein used, means the amount of material which goes into the oil phase (n-decane) over the water phase of a two phase solution containing equal parts by weight of each liquid. Preferably, the group "H" is either phenyl or a linear or branched saturated alkyl group having from two to four carbon atoms. It is also preferred that the group "A" be a linear or branched alkyl group having at least six carbon atoms and any degree of unsaturation.

Covering surfactants have the general formula A-B, with A and B being the same as given in connection with the affinity surfactants described above. Covering surfactants may be included in apparatus of the present invention in quantities sufficient to partially or completely cover the surface of the support, so long as nonspecific binding of the support is, thereby, at least partially reduced.

Solutions containing chromatography surfactants, either alone or in combination with covering surfactants, are preferably single phase solutions. It is also preferred that liquid solvents employed in such solutions be aqueous solvents, though solutions of alcohol (e.g., methanol, ethanol, isopropanol), or other organic solvents containing no water can also be used. Surfactants can also be solubilized in an aqueous solution by adding an alcohol, such as methanol, ethanol, or isopropanol or other organic solvent, thereto. Hence the term "aqueous solution" as used herein is intended to include mixed aqueous solutions, such as water and organic solvent solutions, and the term "water soluble", when applied to surfactants herein, is intended to encompass surfactants soluble in mixed aqueous solutions which would not be soluble in water alone.

The present invention is explained in greater detail in the following examples. These examples are provided to illustrate the present invention, and are not to be taken as limiting thereof.

EXAMPLES 1-3

Preparation of Affinity Surfactants

E. coli beta-galactosidase, chromatographically purified, was obtained from Worthington Biochemicals. P-aminophenyl-beta-D-thiogalactopyranoside (APGP) was purchased from Calbiochem. O-nitrophenyl-beta-D-galactopyranoside (ONPG), bovine trypsin (twice recrystallized), DL-benzoylarginine-p-nitroanilide (DL-BAPNA), p-aminobenzamidine (PAB), cholinesterase (affinity purified from horse serum), procainamide, dithiobisnitrobenzoate, and butyrylthiocholine were obtained from Sigma Chemicals Co. Tresyl chloride (2,2,2-trifluoroethanesulfonyl chloride) was obtained from Fluka and ethyl-(dimethyl-aminopropyl)-carbodiimide (EDC) from Aldrich. The surfactant Sandopan JA36 was obtained from Sandoz Chemicals and the surfactant octaethylene glycol n-hexadecyl ether ($C_{16}E_8$) was obtained from Nikkol Chemicals Co. (Japan). The structures of these surfactants is as shown below:

(a) Sandopan JA36

$$CH_3-(CH_2)_{12}-O-(C_2H_4O)_n-(CH_2)_3-\overset{O}{\underset{\|}{C}}-OH \quad (54\%)$$

$$CH_3-(CH_2)_{12}-O-(C_2H_4O)_n-(CH_2)_3-OH \quad (46\%)$$

$$1 < n < 100, \bar{n} = 19$$

(b) $C_{16}E_8$

The Attachment of APGP to JA36 was performed using a water-soluble carbodiimide synthesis. 100 mg of APGP (0.35 mmoles) were dissolved in 150 ml of distilled water and cooled to 5 degrees Centigrade. 500 mg of EDC (2.5 mmoles) were added to the solution and dissolved. 340 mg of JA36 (0.34 mmoles) were then added dropwise and the pH adjusted to 4.25 with dilute HCl (0.1 N). The pH was maintained between 4.25 and 5.5 during the reaction by addition of either dilute HCl or NaOH. The course of the reaction was monitored by a quantitative determination of residual free amine using the ophthaldialdehyde (OPA) test. See Chen, R.F. et al., *Biochim. Biophys. Acta* 576, 440 (1979); Rowlett, R. and Murphy, J., *Analytical Biochemistry* 112, 163 (1981); Sredos, V.-J. et al., *Analytical Biochemistry* 101, 188 (1980). The reaction proceeded for 60 hours. The product JA36-APGP was purified by repeated foam fractionation of the reaction mixture and the final product was positively identified by 5134C nmr spectroscopy and by ultraviolet absorption.

The specific inhibitor of trypsin, PAB, was also attached to JA36 by a similar EDC-catalyzed reaction. 485 mg of JA36 (0.43 mmoles) was dissolved in distilled water and cooled to 5 degrees Centigrade. 400 mg of EDC (2 mmoles) was then dissolved by dropwise addition with stirring. The pH was adjusted to 4.5 with dilute HCl and, after 15-20 minutes, 250 mg of PAB (1.2 mmoles) were added to the mixture. The reaction mixture was maintained at a pH of between 4.5 and 6.0 by addition of dilute HCl or NaOH. The reaction was followed by monitoring the shift in the absorbance maximum of the ultraviolet spectrum ($\text{lambda}_{max}$ of PAB=290 nm, $\text{lambda}_{max}$ of JA36-PAB =270 nm). The reaction proceeded for 72 hours. The product JA36-PAB was purified by repeated foam fractionation of the reaction mixture and was positively identified by $^{13}$C nmr.

Pyridinium, the specific inhibitor of cholinesterase, was attached to $C_{16}E_8$ by tresylation of the surfactant followed by nucleophilic substitution with the inhibitor. See generally Nilsson, K. and Mosbach, K., *Methods in Enzymology* 104. 56 (1984). Originally we carried out this procedure for the purpose of linking $C_{16}E_8$ to procainamide, using pyridine as an organic base for the reaction. The reaction which we originally believed to produce $C_{16}E_8$-procainamide, we now know to have produced $C_{16}E_8$-pyridinium. Both pyridinium and procainamide are, however, specific inhibitors of cholinesterase.

To attach $C_{16}E_8$ to pyridinium, 600 mg of $C_{16}E_8$ (1.0 mmoles) is dissolved in 10 ml of dichloromethane and the solution cooled to 4. Centigrade. 400 microliters of pyridine and 400 microliters of tresyl chloride is added to the surfactant solution. The reaction proceeds for 1.5 hours with stirring, whereupon an additional 400 microliters of pyridine is added. The solution is then stirred at ambient temperature for 16 hours. The reaction mixture is then dried under vacuum in a rotary evaporator and redissolved in 50 ml of distilled water. The product $C_{16}E_8$-Procainamide is purified by preparative reverse phase HPLC. The chromatographic system consists of a Waters Associates system controller and data module, a U6K injector, two Model 6000A pumps, and a Model 440 UV-visible absorbance detector. Column effluent is monitored at 254 and 280 nm. The aqueous solution containing the product is applied to a stainless steel column (2.5×25 cm) packed with Davisil octadecyl-bonded silica gel (300 Angstrom pore size, 30-40 micron particle size). The flowrate is maintained at 2.0 ml/min and the solvent was 0.1% trifluoroacetic acid (TFA) in water (solvent A). The eluate has no detectable surface activity (as gauged by its inability to foam) and it is deduced that the surfactant is completely retained by the column The surfactant is then eluted with a 120 minute linear gradient from solvent A to 100% solvent B (methanol:iso-propanol:acetonitrile:TFA, 6:3:1:0.1 by volume). The flowrate during elution is maintained at 3.0 ml/min and 10 ml fractions were collected and redissolved in water to gauge surface activity.

Pyridine has an absorbance maximum at 256 nm. Several peaks are eluted from the column having significant absorbance at 259 nm. One of these peaks elutes with a retention time of 127.5 minutes and is surface active (as judged by its ability to foam in aqueous solution). None of the other peaks which absorbed at 259 nm are surface active. The surface active material significantly inhibits the enzymatic activity of horse cholinesterase and is, therefore, judged the desired product. An additional surface active peak elutes at 85 minutes but has no significant absorbance at wavelengths higher than 220 nm and is judged to be unreacted $C_{16}E_8$. The purity of the final $C_{16}E_8$-pyridinium is determined by reverse phase HPLC on a Perkin-Elmer octadecyl-bonded silica cartridge column. Sample aliquots eluted isocratically (95% acetonitrile, 5% water) at the rate of 1.0 milliliters per minute give single, symmetrical peaks with uv detection at both 260 and 210 nm.

The molar extinction coefficient of $C_{16}E_8$-pyridinium at 259 nm is 3118 $M^1$ cm$^{-1}$ (by dry weight). The product final yield is 71.9%. The modified surfactant in solution has a $K_i$ toward horse serum cholinesterase of $5.14 \times 10^{-7}$ M as determined by the method of Dixon. Unmodified surfactant does not have any effect on the activity of horse cholinesterase even at concentrations as high as $10^{-3}$ M.

EXAMPLE 4

Adsorption of Affinity Surfactant to Silica Particles

A high performance affinity chromatographic (HPAC) column was prepared from an Upchurch Scientific HPLC pre-column (2 cm length, 2 mm inside diameter) packed with 0.021 g of Davisil octadecyl-bonded silica (400 Angstrom pore size, 30-40 micron particle size). A dilute (10 micromolar) solution of $C_{16}E_8$-pyridinium was applied to the column and the eluate was monitored at 259 nm, the maximum in the absorbance spectrum of the surfactant-inhibitor. The solution was continuously applied until the absorbance at 259 nm was constant. The capacity of the column was determined in a separate experiment in which 0.1 gms of packing was equilibrated with a 0.1 micromolar $C_{16}E_8$-pyridinium solution by recirculation through the packing on a glass frit until the absorbance at 259 nm was constant. Based on the decrease in absorbance and the extinction coefficient, a capacity of 0.302 micromoles/mg of packing was computed. The column was then washed with 100 ml of 50 mM tris-HCl buffer containing 0.1 M NaCl at pH 8.0. This 0.1 M NaCl Tris-HCl buffer was also the solution used to apply protein mixtures to the column in subsequent examples.

Upon saturation of the packing with the affinity surfactant, the binding was so strong in aqueous solutions that no observable leakage of the surfactant-inhibitor from the packing was detected during elution, even in the presence of 3 M guanidine hydrochloride. From the measured extinction coefficient of the $C_{16}E_8$-pyridinium, as noted above, the specific adsorption of the affinity surfactant to the reverse phase material was determined to be 0.302 micromoles/mg of packing. Since the density of the octadecyl-bonded silica particles is about 1.5 gms/ml, the average ligand loading is roughly 400 micromoles/ml of packing. This is an extraordinarily high capacity when compared to the typical ligand concentrations in ordinary affinity columns.

EXAMPLE 5

Separation of purified Cholinesterase From Bovine Serum Albumin

The ability of the column prepared in Example 4 above to bind cholinesterase preferentially was first demonstrated by separating a mixture of horse serum cholinesterase and bovine serum albumin (0.70 mg/ml total protein concentration, 1:4 w/w). The specific activity of this solution was 22.1 units/mg. One unit of activity is defined as the amount of enzyme hydrolyzing 1.0 micromole of butyrylthiocholine per minute at 25 degrees Centigrade and a pH of 8.0. The column was equilibrated with 0.05 M Tris-HCl buffer, pH 8.0, 0.1 M NaCl at the rate of 1.0 ml/min. When a 100 microliter aliquot of the test protein mixture was applied to the column, all of the cholinesterase was retained Over 90% of the cholinestrase activity was recovered upon application of a sharp 2-minute linear gradient to 0.05 M Tris-HCl, pH 9.0, 1.0 M NaCl. The specific activity of the purified eluate was 250 units/mg, corresponding to a 11-fold purification.

Figure 1:
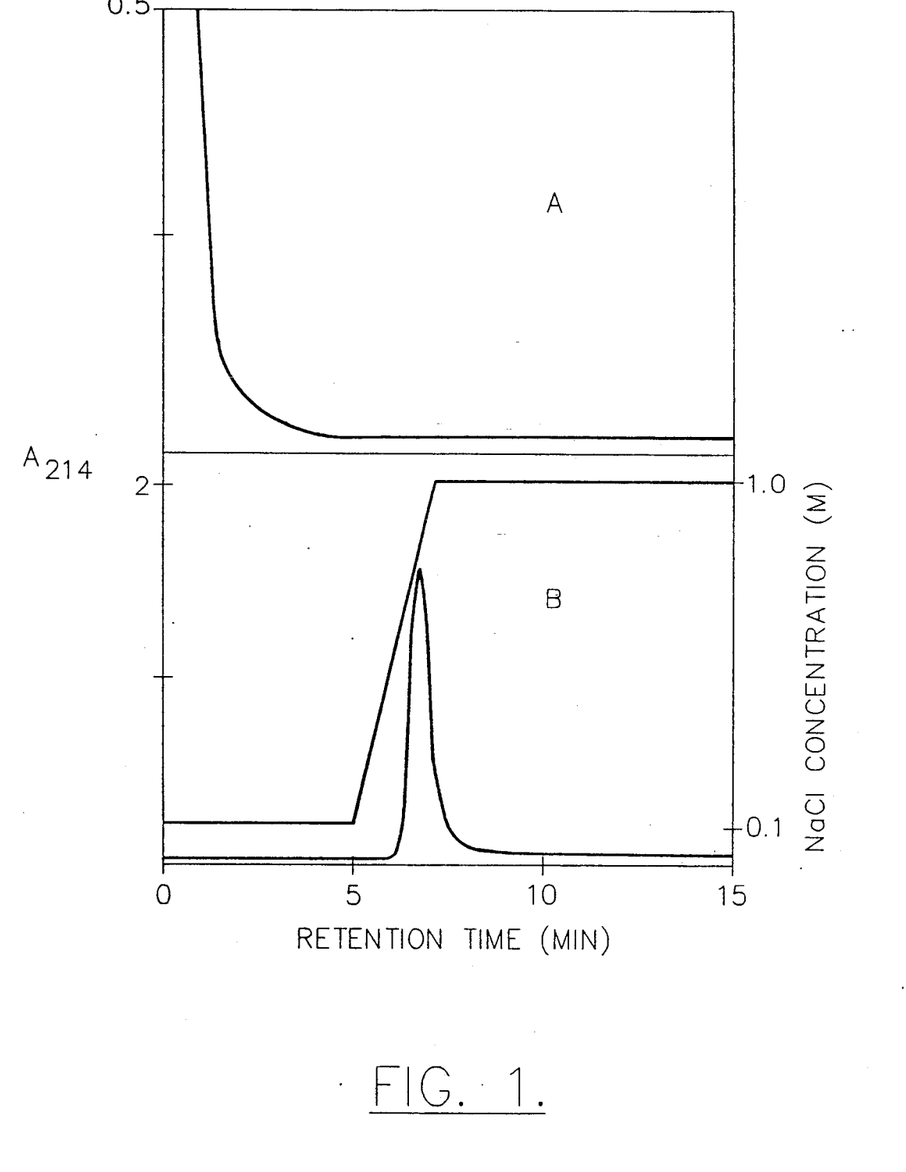
FIG. 1 shows the elution profile of a cholinesterase/bovine serum albumin mixture from an affinity chromatography apparatus of the present invention.

FIG. 1 shows the HPAC elution profile of a 100 microliter aliquot of the test cholinesterase-BSA mixture. Repeated injections of 100 microliter aliquots resulted in cholinesterase peaks of similar area and purity. Doubling the injection size resulted in doubling of the cholinesterase peak area. FIG. 1 shows the cholinesterase peak to be sharp and well-defined. Yet, as already mentioned, reverse phase analysis of the purified product indicated the presence of contaminants. A plausible explanation for this apparent discrepancy is that, due to the small size of the column (2 cm length) and the relatively high gradient flow rate, peak resolution was negligible. Modification of the column length, flow rate, or gradient time should allow for the resolution of the contaminant peaks from the main cholinesterase peak.

EXAMPLES 6-7

Separation of Cholinesterase from Serum

The HPAC column described in Example 4 was then used in the purification of horse and human serum cholinesterase. Non-sterile, non-filtered grade horse serum was obtained from Pel-Freeze Biologicals. Human serum was donated by one of the inventors. In this case, a sample of whole blood was centrifuged at 3000 RPM for 15 minutes. The supernatant was removed and the buffy coat discarded. The specific activity of cholinesterase in the horse serum was 0.054 units/mg and that in the human serum 0.066 units/mg.

Application of 200 microliter aliquots of both horse and human serum to the column resulted, in each case, in the elution of a broad and large protein peak. In both cases, application of the same 2-minute gradient to 1.0 M NaCl resulted in elution of a sharp peak containing cholinesterase activity. These peaks had the same retention times as the cholinesterase peaks obtained with the enzyme test mixture of cholinesterase-BSA. With the horse serum, the amount of cholinesterase recovered corresponded to 84.2% of the activity applied and with the human serum, the activity yield was 80.7%. The specific activities of the purified cholinesterase from horse and human serum were 15.1 and 5.18 units/mg, respectively. These values correspond to 280 and 79-fold enrichments of cholinesterase. Reverse phase HPLC analysis showed that the gradient-induced eluate from horse serum was 2.2% cholinesterase while that obtained from the human serum 0.95% pure enzyme.

Figure 2:
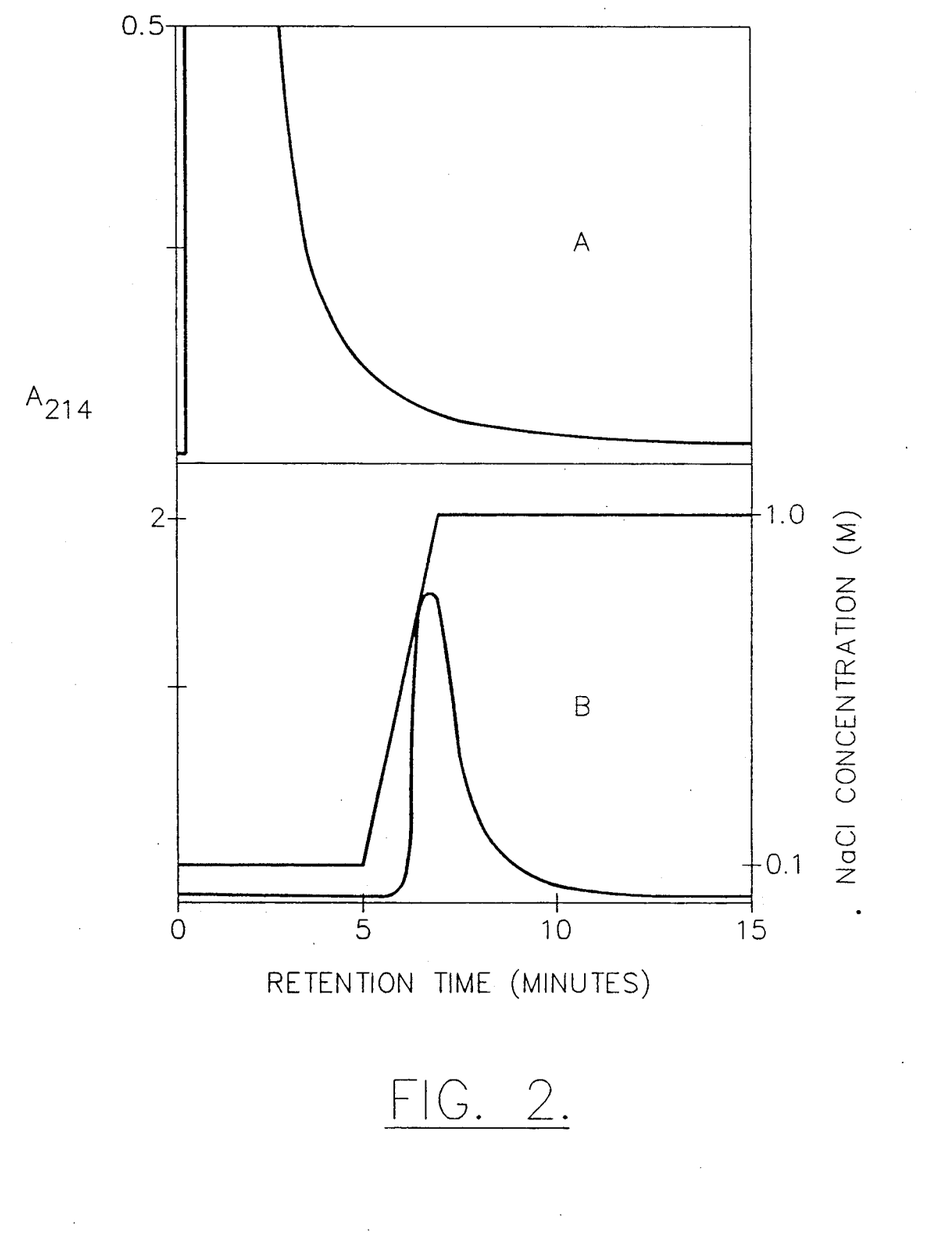
FIG. 2 shows the elution profile of cholinesterase in partially purified human serum sample from an affinity chromatography apparatus of the present invention.

FIG. 2 shows the HPAC elution profile for the purification of the human serum cholinesterase. As with the enzyme test mixture, even though the gradient-induced eluate appears to be a sharp peak, the reverse phase HPLC analysis described above reveals that the cholinesterase in this peak is only 0.95% pure. Again, the resolution in the small test column was insufficient to separate components eluting at the beginning of the gradient and those at the end of the gradient This is not surprising after one considers that a column this short will allow significant mixing, especially with such a sharp gradient. The product purity could undoubtedly be greatly enhanced by applying a longer gradient, by using a longer column, or by eluting the enzyme with a specific inhibitor such as choline chloride.

An analysis of FIG. 2 also shows that the initial peak, corresponding to the non-binding serum proteins, is much smaller than what one would expect based on the original protein content of the serum. The reason for this is that a significant fraction of the proteins that do not interact with the immobilized ligand are irreversibly retained by the column in aqueous solution This was established from binding studies of proteins other than cholinesterase with octadecyl reverse phase packing. However, there is a finite number of these binding sites, and when they are filled, the column only retains molecules interacting specifically with the immobilized inhibitor.

The irreversible, non-specific binding of proteins to the HPAC column does not appear to interfere with the specific interaction of cholinesterase with the column. The ethylene oxide groups between the hydrophobic tail and the procainamide moiety serve as a long (ca. 20-30 Angstroms) spacer arm which effectively places the inhibitor in free solution. Since the spacer arm is so long and contains no ionizable groups, the possibility of non-specific ionic binding to the immobilized surfactant, relative to conventional affinity chromatography, is greatly reduced.

EXAMPLE 8

Removal of Affinity Surfactant From Solid Support

The affinity surfactant is easily removed from the column described in Example 4 above by passing a 6:4 Volume/Volume mixture of methanol and isopropanol through the column. The packing can then be sterilized and new affinity surfactants—either the same as or different from those removed—adsorbed to the packing by the procedures described herein.

The invention described above may be used for a broad variety of separation procedures, and embodied in a variety of different apparatus and compositions. Accordingly, the foregoing discussion is to be considered illustrative, and not limiting, with the scope of the present invention being defined by the following claims. Equivalents of the claims are to be included therein

EXAMPLE 9

Binding of Surfactants to Polypropylene Support

A $2.5 \times 10^{-3}$ Molar aqueous solution of pentaethylene glycol mono-n-dodecyl ether ($C_{12}E_5$) is circulated over a hydrophobic polypropylene membrane in an enclosed chamber until the transmembrane flux for the aqueous solution increases to a noticeably improved steady state. After this treatment, the chamber is emptied, dried, and aspirated with air for 1.5 hours. After this treatment, the transmembrane flux for water is measured, and is found to be essentially the same as the steady state transmembrane flux for the aqueous $C_{12}E_5$ solution. After this, a 0.1 M Tris-HCl buffer solution at pH 8 is continuously circulated across the membrane for 24 hours, during which time the transmembrane pressure remains constant. These procedures show that the surfactant remains adsorbed to the membrane while water, air, and buffer solution are circulated across the membrane

EXAMPLE 10

Synthesis of 2 (n-hexadecylheptaethoxy)acetic Acid $CE_8$ (1 gram) was dissolved in approximately 80 milliliters of deionized water. Potassium permanganate (355 milligrams) was added to the solution, together with three drops of 1 M sodium hydroxide. The mixture was stirred overnight at room temperature. The excess permanganate was reduced by addition of sodium bisulfite and the resulting manganese dioxide precipitate removed by vacuum filtration. The filtrate was then acidified with concentrated hydrochloric acid and the precipitated $C_{16}E_7$—$CH_2$—COOH was removed by centrifugation. $_{13}$C-NMR analysis confirmed the presence of carbonyl carbon group in the product and showed characteristic peaks for the surfactant. Isocratic reverse phase HPLC showed a single peak for the product.

EXAMPLE 11

Synthesis of 1-(n-hexadecyloctaethoxy)ethylenediamine $C_{16}E_8$ (0.5 gram) was dissolved in 20 milliliters of dimethylsulfoxide and the solution cooled to 5 degrees C. Tresyl chloride (0.37 milliliter, 4 mmol) and 0.1 milliliter of triethylamine were added to the solution with stirring. The solution was stirred for 1.5 hours at room temperature, after which 1.25 milliliters of ethylene diamine (20 mmol) was added to the reaction mixture. The reaction was allowed to proceed for 24 hours at which point the solvent was distilled under vacuum. The mixture was redissolved in 50 milliliters of water.

The aminated surfactant was purified by reverse phase HPLC using a stainless steel column (2.5×25 centimeters) packed with Davisil TM octadecyl-bonded silica. The column was washed with 250 milliliters of 0.1% trifluoroacetic acid (TFA) in water (solvent A) at the rate of 2.0 milliliters per minute, prior to sample application. The surfactant was completely retained by the column in solvent A, since the column eluate had no detectable surface activity (as gauged by its inability to foam in an aqueous solution). The surfactant was eluted with solvent B (methanol: iso-propanol: acetonitrile: TFA, 6:3:1:0.01 by volume). The absorbance of the column effluent was monitored at 220 nm. The flowrate during elution was kept at 5.0 milliliters per minute at 7.5 milliliter fractions were collected and redissolved in water to gauge surface activity Three purification steps with different linear gradient combinations were required to obtain homogeneous material. The purified material gave a positive test for amines using sodium 2,4,6-trinitrobenzene sulphonate. See J. Inman and H. Dintzis, *Biochemistry* 8, 4074 (1969).

EXAMPLE 12

Synthesis of N-(n-hexadecyloctaethoxy)pyridinium $C_{16}E_8$-Pyridinium was synthesized by tresylation of $C_{16}E_8$ followed by reaction with pyridine and purification by reverse phase HPLC as described in Examples 1-3 above.

EXAMPLES 13-15

Preparation of test columns

Test columns consisted of Upchurch Scientific precolumns (internal dimensions: 2×20 millimeters) packed with 24±1 milligram of Davisil TM octadecyl-bonded wide-pore silica (30-40 micrometer particle size, 300 Å pore diameter). The freshly packed columns were initially washed with several hundred column volumes of methanol at 1.0 milliliters per minutes, followed by a similar volume of deionized water. Adsorption of the surfactants described in Examples 10-12 above to the packing is done by recirculating $10^{-4}$ M aqueous solutions of the appropriate surfactant through the columns at the rate of 1.0 milliliters per minute for a period of no less than four hours. For this purpose a Perkin-Elmer series 10 isocratic HPLC pump is used. A maximum value of 0.37 micromoles of surfactant per milligram of packing is obtained from adsorption studies with $C_{16}E_8$-Pyridinium. This value compares well with the 0.6 micromoles of surfactant per milligram of packing found by Bischoff et al., *J. of Chrom.* 257, 305 (1983).

The columns were then rinsed with water followed by several hundred column volumes of 50 mM Tris-HCl buffer, pH 8.0 (Buffer A). Unless otherwise stated, the columns were equilibrated with Buffer A prior to protein application. Proteins were eluted with various linear gradients to 50 mM Tris-HCl buffer, pH 8.0, 1.0 M NaCl (Buffer B). The absorbance of the effluent was monitored at 280 nm. The surfactant was removed in preparation for reverse phase mode of operation by rinsing the column with acetonitrile at 1 milliliter per minute overnight.

EXAMPLES 16-17

Preparation of Test Solutions

Protein determinations: Standard protein solutions were prepared by dissolving a dry weight amount of each test protein in Buffer A. The concentration of these solutions were as follows bovine serum albumin, 1.2 milligrams per milliliter; lysozyme, 3.0 milligrams per milliliter; trypsin, 2.9 milligrams per milliliter; cholinesterase, 1.5 milligrams per milliliter. The detector response was calibrated using these standard solutions by directly connecting the outlet of the injector to the inlet of the detector. The average of the integrated peak areas for multiple injections of each of the standard solutions was used to calibrate the detector at 280 nm.

The activity of cholinesterase and carboxylesterase solutions was determined by the method of Ellman et al., *Biochem. Pharmacol.* 7, 88 (1961). In the case of cholinesterase, butyrylthiocholine was used as substrate, and phenylthiobutyrate was used as substrate for determination of carboxylesterase activities. One unit of enzymatic activity corresponded to the hydrolysis of one micromole per minute of a 1 mM substrate solution at 25 degrees Celsius in 0.05 M Tris-HCl buffer, pH 8.0.

Preparation of clarified liver homogenate. Frozen beef liver (446 grams) was homogenized in 500 milliliters of 50 mM Tris-HCl buffer, pH 8.0 (Buffer A) at 5 degrees Celsius. The homogenate was allowed to stand for 15 minutes and then diluted with an additional 500 milliliters of Buffer A. A fraction of the homogenate (500 milliliters) was saved and the remainder filtered through six layers of cheese cloth, followed by a course glass-sintered funnel. The filtrate was centrifuged for 30 minutes at 4000 RPM at 5 degrees Celsius. The supernatant (630 milliliters) was saved.

Ammonium sulfate (123.5 grams) was slowly added to the clarified homogenate at 5 degrees Celsius. After allowing the solution to stand for 0.5 hours at 5 degrees Celsius, the solution was centrifuged at 4000 RPM for one hour and the supernatant (470 milliliters) was dialyzed against 6 liters of Buffer A for 6 hours and then against 12 liters of Buffer A for 12 hours at 5 degrees Celsius. A fraction of the dialyzate (180 milliliters) was ultrafiltered using an Amicon (100,000 MW cutoff) YM100 membrane at 5 degrees Celsius. Most of the phenylthiobutyrate activity (98.0%) remained in the retentate. The retentate was used for the purification experiment.

EXAMPLE 18

Cation-Exchange Chromatography of Lysozyme and BSA

The chromatographic system used consisted of a Perkin-Elmer series 410 quaternary gradient elution pump and a Perkin-Elmer series LC-95 UV/visible spectrophotometric detector. Data was acquired in part with a Perkin-Elmer series 3600 data station and in part with a MacIntosh Se digital computer equipped with the Dynamax TM Software Data Acquisition package (Rainin Co.).

The cation-exchange characteristics of the test octadecyl-bonded column adsorbed with $C_{16}E_7$—$CH_2$—COOH described in Examples 13-15 above were studied initially using lysozyme and BSA. Lysozyme, with an isoelectric point (pI) of 11.0 should be positively charged in the equilibrating buffer at a pH of 8.0. BSA, on the other hand, has a reported pI value of 4.9 and should therefore bear a negative charge at a pH of 8.

Standard solutions of lysozyme (3.0 milligrams of protein per milliliter) and BSA (1.2 milligrams of protein per milliliter) were prepared in Buffer A as described in Examples 16-17 above. Aliquots of 20 microliters of these solutions were applied to the $C_{16}E_7$—$CH_2$—COOH test column. Adsorbed proteins were eluted with a 20 minute linear gradient to Buffer B (50 mM HCl, pH 8.0, 1.0 M NaCl). Proteins that were not retained by the test column would elute in approximately 0.30 minute whereas retained proteins eluted after about 8.5 minutes after application of the gradient to Buffer B. The amount of protein in each eluted peak was determined from the integrated peak areas and calibration injections as described above. High peak efficiencies and recoveries were not observed initially when freshly adsorbed columns were used to analyze the test proteins. Optimum and consistent column behavior was obtained only after the column had been treated with several injections (20 microliters) of the lysozyme standard solution. After this treatment, typical analyses of the test proteins gave the following results.

In the case of lysozyme 106% of the applied protein was calculated to be present in the retained peak. This value was based on the integrated peak area and the calibration value obtained as described above. When BSA was applied to the column 102% of the applied protein was calculated to be present in the unretained peak. In both cases there was almost no loss of material in the column due to irreversible hydrophobic adsorption. When mixtures of lysozyme and BSA were applied to the test column (30 micrograms of lysozyme and 12 micrograms of BSA per injection) there was near complete resolution of the two proteins FIG. 3 shows the elution profiles for the analyses of BSA, lysozyme, and the BSA/lysozyme mixture. Recoveries of greater than 100% were obtained because of a positive bias present in the integration of broad peaks which had some degree of tailing, as with the elution of retained peaks, versus very narrow peaks, as obtained in the calibration procedure with no column. The magnitude of this bias was not higher than 15% and depended on the shape of the particular peak.

EXAMPLE 19

Cation Exchange Chromatography of Trypsin

This example was conducted in accordance with Example 18 above. The activity of trypsin solutions were determined by a method similar to that described by Erlanger et al., *Arch. Biochem. Biophys.* 95, 271 (1961), using BAPNA as substrate. An aliquot (0.5 milliliter) of the trypsin solution to be assayed was diluted in 1.5 milliliters of 0.05 M Tris-HCl buffer, pH 8.15, containing 0.02 M $CaCl_2$ in a 3.5 milliliter disposable polystyrene cuvette. A 100 microliter aliquot of a $10^{-2}$ M solution of BAPNA in dimethylsulfoxide was then added to this solution. The rate of change in absorbance at 388 nm at 25 degrees Celsius was then measured in a Schimadzu UV 160 spectrophotometer. One unit of activity was defined as the amount of enzyme causing an absorbance change of 0.1 per minute under these conditions.

A solution of trypsin (2.9 milligrams of protein per milliliter) was prepared in Buffer A and several activity assays were made over the course of three days to determine its stability at 4 degrees Celsius. No significant loss in tryptic activity was observed, and therefore the solution was assumed to be stable for several days at this temperature. Aliquots of 20 and 100 microliters were applied to the $C_{16}E_7$—$CH_2$—COOH test column as described for the analysis of lysozyme and BSA samples in Example 18 above. In this case the eluted peaks were collected and assayed for enzymatic activity.

Initially, operation of the column was done at room temperature. At this temperature, when 58 micrograms of trypsin (2.56 units) were injected into the column under initial conditions of 100% Buffer A, an unretained peak was eluted at 0.22 minutes which contained no tryptic activity. In the retained peak, only 24% of the enzymatic activity was recovered. Larger injections of trypsin, also at room temperature (290 micrograms, 11.0 units), resulted in the same low recovery of enzymatic activity. In the latter cases, 37% of the total injected activity was recovered, of which 35% was eluted in the void volume and 65% was eluted during the course of the gradient.

In an effort to improve overall recovery, the gradient to 100% Buffer B was shortened to 5 minutes and an ice bath was used to cool the outside of the column to 4 degrees Celsius. When 290 micrograms of trypsin were applied to the column under these conditions, 13% of the activity was found in the unretained peak and 86% of the activity was found in the peak which eluted upon application of the gradient, with an overall activity recovery of 99%. During the experiments with this column, no loss in performance was observed even after 85,000 column volumes of buffer had circulated through the column. Bischoff et al., *Anal. Biochem.* 151, 526 (1985); *J. of Chrom.* 296, 329 (1984); *J. of Chrom.* 257, 305 (1983), found that their columns also continued to perform well after several thousand column volumes of use.

EXAMPLE 20

Reverse Phase Chromatography of Test Proteins

The $C_{16}E_7$—$CH_2$—COOH test column used as a cation-exchange support in Examples 18-19 above was washed with acetonitrile to remove the adsorbed surfactant. This column was then used in the reverse phase chromatography of lysozyme, BSA, and trypsin. All the proteins were retained by the column under initial conditions of 0.1% trifluoroacetic acid in water. A 5 minute linear gradient from initial conditions to 0.1% trifluoroacetic acid in acetonitrile was used to elute the proteins. Lysozyme eluted at 8.84 minutes whereas BSA eluted at 9.07 minutes. The chromatogram of trypsin showed three peaks with retention times of 7.77, 8.16, and 8.85 minutes. The relative peak areas were 46.8%, 13.7%, and 39.5%, respectively. The column was then equilibrated with Buffer A and a 100 microliter injection of the lysozyme stock solution was made. No protein eluted upon application of a gradient to 100% Buffer B, indicating that the stationary phase is hydrophobic and that no residual ion-exchange capacity remained The multiplicity of peaks in the chromatogram of trypsin can be explained by different molecular species of the same enzyme (i.e., isozymes).

The column was again adsorbed with $C_{16}E_7$—$CH_2$—COOH using the same procedure done initially. The column was equilibrated with several hundred column volumes of Buffer A and used for the analysis of lysozyme, BSA, and trypsin as before. The protein retention behavior was similar to that described previously.

EXAMPLE 21

Anion-Exchange Chromatography with N-(n-hexadecyloctaethoxy)pyridinium

The anion-exchange properties of the $C_{16}E_8$-Pyridinium test column prepared in Examples 13-15 above were evaluated with BSA and lysozyme. The same stock protein solutions used in the evaluation of the $C_{16}E_7$—$CH_2$—COOH test column were also used for these experiments. The column was initially conditioned with multiple injections of BSA standard solution as previously described. Injection of a 25 microliter aliquot of BSA resulted in the adsorption of all the protein and a calculated recovery of 113% of the protein upon applying a two minute gradient to Buffer B. Application of a 25 microliter aliquot of the lysozyme standard solution resulted in the elution of 110% of the applied protein unretained.

A solution of $C_{16}E_8$-Pyridinium ($10^{-4}$ M) was again recirculated through the column for four hours at the rate of 1.0 milliliter per minute. This was done to investigate the effect of re-equilibration with surfactant on column performance. The interaction of bovine liver carboxylesterase (CE) with the readsorbed column was studied with a solution of purified enzyme having an enzymatic activity of 29.1 phenylthiobutyrate units per milliliter and a protein concentration of 1.72 milligrams per milliliter. Initially, a 25 microliter aliquot of the CE solution was applied to the $C_{16}E_8$-Pyridinium test column. This resulted in all the protein and activity present in the aliquot being retained by the column. Upon application of a 2.0 minute gradient to Buffer B, 90.8% of the applied protein eluted. However, no enzymatic activity was recovered. The column was then treated with a large injection (200 microliters) of the CE stock solution. After this treatment, analysis of a 25 microliter aliquot of the CE solution resulted in 86.7% of the applied protein being retained. The remaining protein was not retained, and contained no enzymatic activity. Upon elution with Buffer B all the adsorbed protein was recovered and this fraction contained all the activity units present in the original 25 microliter aliquot. Therefore, the 13% of protein that was unretained by the column contained no CE and were probably positively-charged contaminants in the original CE sample.

The $C_{16}E_8$-Pyridinium test column was then used to purify the carboxylesterase present in the clarified liver homogenate prepared in Examples 16-17 above. The liver homogenate had an activity of 14.1 phenylthiobutyrate units per milliliter and a protein concentration of 21.1 milligrams per milliliter. Protein concentration was determined, in this case, by measuring the absorbance at 280 nm of the protein solutions and assuming an extinction coefficient of 1.0 (milligram per milliliter)$^{-1}$. Therefore, the specific activity of the homogenate was 0.67 units per milligram of protein. Injection of a 50 microliter aliquot of homogenate under initial conditions of 100% Buffer A resulted in two unretained and poorly-resolved peaks which corresponded to 57% of the applied protein as determined from the integrated peak areas. The material under these peaks contained 0.20 units of activity which corresponded to 28% of the applied activity. Upon application of a two minute linear gradient to Buffer B, two peaks eluted and these contained 43% of the applied protein. The first peak (8.32 minute retention time) contained 0.40 units of activity (56%), whereas the second peak (8.87 minute retention time) had no activity. This indicated an overall activity recovery of 85%. The specific activity of the purified CE was calculated to be 1.25 units per milligram of protein, corresponding to a purification factor of 1.9. The reason that a small number of peaks was observed for the analysis of a complex protein mixture, such as a liver homogenate, is that due to the small size of the column relative to the particle diameter and the steep gradient used, the column had very few theoretical plates. Improvements in peak resolution were not addressed since the objective was to study the retention characteristics of the modified supports and, for such purposes, the simple retention behavior of the test columns used was adequate.

EXAMPLE 22

Anion Exchange with 1-(n-hexadecyloctaethoxy) ethylenediamine

The anion-exchange characteristics of the $C_{16}E_7$—$CH_2CH_2NHCH_2CH_2NH_2$ test column prepared in Examples 13-15 above were initially tested using BSA and lysozyme. In this case, however, the pH of Buffers A and B was adjusted to 7.4 in an effort to minimize the amount of silica degradation which occurred at a pH of 8.0 during the studies using $C_{16}E_8$-Pyridinium test columns and which resulted in excessively high pressure drops across the columns. As mentioned above, this degradation was not observed in the $C_{16}E_8$—$CH_2$—COOH column. This observation can be attributed to a localized lowering of the pH brought about by the concentration of carboxylate groups of the derivatized surfactant. Use of pH 7.4 buffers resulted in greatly improved column stability in the anion-exchange systems.

As in the case of $C_{16}E_8$-Pyridinium, BSA was retained by the column whereas lysozyme was not. Initially, 25 microliter aliquots of the standard BSA solution were injected into the column. This resulted in poor protein recovery (<30%) and considerable peak tailing. When larger injections sizes were used (>100 microliters), peak recoveries were much improved and consistent. Peak efficiencies were also improved and symmetrical peaks were observed.

In the case of lysozyme an injection of 100 microliters resulted in the elution of an unretained peak at 0.2 minutes. The integrated peak area indicated 106% recovery. No protein was eluted from the column with a two minute gradient to Buffer B. In the case of BSA (200 microliter injection), an unretained peak was observed (0.36 minutes) corresponding to 40% of the applied sample. This was possibly due to exceeding the column capacity. A peak eluted at 8.3 minutes upon application of the gradient to Buffer B. The area of this peak corresponded to 50% of the applied protein. Therefore, the overall protein recovery was 90%.

Application of a 50 microliter aliquot of affinity-purified serum cholinesterase (1.90 units) resulted in the elution of an initial peak (0.27 minutes) containing no enzymatic activity and corresponding to 16.2% of the applied protein. Upon application of the gradient to Buffer B, a peak eluted (8.3 minute retention time) containing 1.95 units of activity (103% activity recovery) and corresponding to 83.7% of the applied protein. When horse serum (100 microliters, 5.77 units per milliliter) was applied to the column over 30% of the applied protein was retained by the column, but all the cholinesterase activity applied was found in the unretained fraction.

EXAMPLE 23

Ion Exchange Chromatography with Surfactants Bound to a Hydrophobic Polymer Support High density polypropylene porous particles purchased under the trade name of ACCUREL® were hydrophilyzed with $C_{16}E_7CH_2COOH$ and used in the Ion-Exchange purification of bovine heart cytochrome C. A glass column (8.5×2.5 cm) was packed with about 2.63 grams of ACCUREL® powder in an aqueous suspension. The particles had been washed with methanol, deionized water, and finally had been allowed to equilibrate for four hours in 100 milliliters of a 0.05 M solution of $C_{16}E_7CH_2COOH$. The column was equilibrated with 50 ml of 10 mM Tris-acetate buffer pH 6.9 prior to use.

A clarified bovine heart homogenate was prepared by homogenizing 114 grams of beef heart tissue in a 0.3% aluminum sulfate solution The homogenate was filtered through five layers of cheesecloth and the pH of the filtrate adjusted to 8.6 with ammonium hydroxide. The solution was finally filtered through a coarse glass-fritted funnel. A five milliliter aliquot of this homogenate was applied to the surfactant-modified ACCUREL® column. The cytochrome C content of the bovine heart homogenate was effectively retained by the column. The column was washed with several column volumes of equilibrating buffer. The cytochrome C was then eluted with a 1.0 M NaCl solution in equilibrating buffer. Approximately 80% of the applied cytochrome C was recovered and this corresponded to a thirty-fold purification.

The extent of hydrophilization of ACCUREL® was determined using the parent surfactant, namely $C_{16}E_8$. A small glass column was packed with 126.3 milligrams of ACCUREL®. The column was washed with 20 milliliters of methanol, followed by 20 milliliters of deionized water. The column was then treated with 146 milliliters of a $10^{-3}$ M solution of $C_{16}E_8$. The ligand loading was estimated to be 0.96 μmoles per milligram of packing. The column was then equilibrated with 20 milliliters of 10 mM Trisacetate, pH 7.5. Treatment of the column with several five milliliter aliquots of a purified bovine cytochrome C solution (0.8 milligrams per milliliter) resulted, in each case, in the recovery of 99% of the applied protein.

The foregoing examples are for illustrative purposes only, and are not to be taken as restricting the scope of this invention. Applicants' invention is defined by the following claims, with equivalents of the claims to be included therein.

That which is claimed is:

1. An affinity chromatography apparatus, comprising:
    an enclosed chamber having an inlet opening and an outlet opening;
    a solid support contained within said enclosed chamber, said solid support having hydrophobic functional groups bonded to the surface thereof and forming a hydrophobic layer thereon;
    affinity surfactants bonded to said solid support, said affinity surfactants comprising a polar group, a hydrophobic functional group substituted on said polar group, and a ligand substituted on said polar group, with said hydrophobic functional group hydrophobically adsorbed to said hydrophobic layer formed on said solid support, said ligands being free of compounds which selectively bind thereto and available for binding to compounds which are selectively bound thereby; and
    covering surfactants bonded to said solid support, said covering surfactants consisting essentially of a nonionic polar group and a hydrophobic functional group substituted on said nonionic polar group, with said hydrophobic functional group being hydrophobically adsorbed to said hydrophobic layer formed on said solid support and with said covering surfactant being provided in a quantity sufficient to cover said hydrophobic layer so that non-specific binding to said hydrophobic layer during use of the apparatus is reduced.

2. An affinity chromatography apparatus as claimed in claim 1, said polar groups of said affinity surfactant and said covering surfactant comprising a polyalkoxy group having at least 2 alkoxy groups, said alkoxy groups selected from the class consisting of ethoxy and isopropoxy.

3. An affinity chromatography apparatus as claimed in claim 2, wherein said hydrophobic functional group of said affinity surfactant and said covering surfactant are selected from the class consisting of benzyl and linear and branched alkyl groups having from 2 to 50 carbon atoms and any degree of unsaturation.

4. An affinity chromatography apparatus as claimed in claim 3, wherein said polyalkoxy group has from 5 to 30 alkoxy groups, and said hydrophobic functional group of said affinity surfactant is a linear alkyl group having from 8 to 50 carbon atoms.

5. An affinity chromatography apparatus as claimed in claim 4, wherein said hydrophobic functional group bonded to said solid support is a linear alkyl group having from 8 to 50 carbon atoms.

6. An affinity chromatography apparatus as claimed in claim 1, wherein said ligand is an antibody.

7. An affinity chromatography apparatus as claimed in claim 1, wherein said ligand is a nucleic acid.

8. An affinity chromatography apparatus as claimed in claim 1, wherein said ligand is a peptide.

9. An affinity chromatography apparatus as claimed in claim 1, wherein said ligand is a chelating agent.

10. An affinity chromatography apparatus as claimed in claim 1, wherein said ligand is an enzyme inhibitor.

11. An affinity chromatography apparatus as claimed in claim 1, wherein said ligand is selected from the group consisting of receptor agonists and receptor antagonists.

* * * * *

UNITED STATES PATENT AND TRADEMARK OFFICE
CERTIFICATE OF CORRECTION

PATENT NO. : 5,045,190
DATED : September 3, 1991
INVENTOR(S) : Reuben G. Carbonell, Peter K. Kilpatrick, Juan Luis Torres and Roberto Guzman It is certified that error appears in the above-identified patent and that said Letters Patent is hereby corrected as shown below:

Column 6, line 1, "AND" should read --NAD--.

Column 7, line 31, "-N+HR$_2$" should read --N$^+$HR$_2$--.

Column 7, line 33, "N+H" should read --N$^+$H--.

Column 7, line 33, "N+H" should read --N$^+$H.

Column 7, line 34, "N+" should read --N$^+$.

Column 11, line 2, insert a period (.) after retained.

Column 13, line 4, "CE$_8$" should read --C$_{16}$E$_8$--.

Column 14, line 33, insert colon (:) after follows.

Signed and Sealed this

Fifteenth Day of June, 1993

Attest:

MICHAEL K. KIRK

Attesting Officer

Acting Commissioner of Patents and Trademarks